(12) United States Patent
Sparling et al.

(10) Patent No.: US 7,662,215 B2
(45) Date of Patent: Feb. 16, 2010

(54) METHODS FOR REMOVING SULFUR-CONTAINING COMPOUNDS

(75) Inventors: Christopher W. Sparling, The Woodlands, TX (US); P. Scott Northrop, Spring, TX (US); Johnny E. Johnson, Denver, CO (US); Jagannathan N. Iyengar, Centreville, VA (US); Barry M. Friedman, Denver, CO (US)

(73) Assignee: ExxonMobil Upstream Research Company, Houston, TX (US)

( * ) Notice: Subject to any disclaimer, the term of this patent is extended or adjusted under 35 U.S.C. 154(b) by 263 days.

(21) Appl. No.: 11/628,826

(22) PCT Filed: Jun. 20, 2005

(86) PCT No.: PCT/US2005/021915

§ 371 (c)(1),
(2), (4) Date: Oct. 22, 2007

(87) PCT Pub. No.: WO2006/016979

PCT Pub. Date: Feb. 16, 2006

(65) Prior Publication Data

US 2008/0107581 A1    May 8, 2008

Related U.S. Application Data

(60) Provisional application No. 60/587,223, filed on Jul. 12, 2004.

(51) Int. Cl.
*B01D 53/14* (2006.01)
(52) U.S. Cl. ............................. 95/172; 95/235; 95/236; 423/220; 423/570

(58) Field of Classification Search .................. 95/172, 95/176, 203, 235, 236, 266; 423/220, 228, 423/229, 570
See application file for complete search history.

(56) References Cited

U.S. PATENT DOCUMENTS 3,989,811 A    11/1976    Hill (Continued)

FOREIGN PATENT DOCUMENTS

EP          0 243 542 A1    11/1987

(Continued)

OTHER PUBLICATIONS

N. A. Hatcher et al., "Integrating CONSOLV System Technology into Your Sour Gas Treating/Sulfur Recovery Plant", Mar. 1-4, 1998, pp. 381-407, Norman, OK.

(Continued)

*Primary Examiner*—Frank M Lawrence
(74) *Attorney, Agent, or Firm*—ExxonMobil Upstream Research Company-Law Department

(57) ABSTRACT

A method for removing sulfur-containing compounds is provided. In one embodiment, the method includes selectively separating a feed stream (118) comprising carbon dioxide and one or more sulfur-containing compounds, including hydrogen sulfide, at conditions sufficient to produce a first stream (122) comprising carbon dioxide and hydrogen sulfide and a second stream (124) comprising carbon dioxide and hydrogen sulfide. A molar ratio of carbon dioxide to hydrogen sulfide in the first stream is greater than a molar ratio of carbon dioxide to hydrogen sulfide in the second stream, and a molar ratio of hydrogen sulfide in the first stream to hydrogen sulfide in the second stream is about 0.005 or more.

58 Claims, 3 Drawing Sheets

U.S. PATENT DOCUMENTS

| | | | |
|---|---|---|---|
| 4,134,824 A | 1/1979 | Kamm et al. | |
| 4,180,548 A | 12/1979 | Say et al. | |
| 4,282,194 A | 8/1981 | Say et al. | |
| 4,292,286 A | 9/1981 | Say et al. | |
| 4,356,161 A | 10/1982 | McNamara et al. | |
| 4,548,620 A * | 10/1985 | Albiol | 95/174 |
| 4,552,572 A | 11/1985 | Galstaun | |
| 4,589,896 A | 5/1986 | Chen et al. | |
| 4,622,210 A | 11/1986 | Hirschberg et al. | |
| 4,965,062 A | 10/1990 | Van Dijk et al. | |
| 5,021,232 A | 6/1991 | Hise et al. | |
| 5,229,091 A | 7/1993 | Buchanan et al. | |
| 5,262,139 A | 11/1993 | Hakka et al. | |
| 5,292,492 A | 3/1994 | Buchanan et al. | |
| 5,304,361 A | 4/1994 | Parisi | |
| 5,377,756 A | 1/1995 | Northrop et al. | |
| 5,415,231 A | 5/1995 | Northrop et al. | |
| 5,463,165 A | 10/1995 | Northrop | |
| 5,556,605 A | 9/1996 | Stigsson | |
| 5,738,834 A | 4/1998 | Deberry | |
| 5,741,469 A | 4/1998 | Bhore et al. | |
| 5,785,888 A | 7/1998 | Tsai et al. | |
| 5,820,837 A * | 10/1998 | Marjanovich et al. | 423/220 |
| 6,096,239 A | 8/2000 | Fung et al. | |
| 6,183,540 B1 | 2/2001 | Thonsgaard | |
| 6,289,988 B1 | 9/2001 | Myers et al. | |
| 6,387,159 B1 | 5/2002 | Butwell et al. | |
| 6,444,185 B1 | 9/2002 | Nougayrede et al. | |
| 6,495,117 B1 | 12/2002 | Lynn | |
| 6,508,863 B1 | 1/2003 | Byrne et al. | |
| 6,508,998 B1 | 1/2003 | Nasato | |
| 6,521,020 B2 | 2/2003 | Butwell et al. | |
| 6,610,264 B1 | 8/2003 | Buchanan et al. | |
| 6,645,459 B2 | 11/2003 | Lynn | |
| 7,128,150 B2 | 10/2006 | Thomas et al. | |
| 2002/0025284 A1 | 2/2002 | Watson et al. | |
| 2002/0062735 A1 | 5/2002 | Lecomte et al. | |
| 2003/0057136 A1 | 3/2003 | McIntush et al. | |
| 2003/0194366 A1 | 10/2003 | Srinivas et al. | |

FOREIGN PATENT DOCUMENTS

| | | |
|---|---|---|
| EP | 0 798 032 A1 | 10/1997 |
| WO | WO 93/21107 | 10/1993 |
| WO | WO 94/19091 | 9/1994 |
| WO | WO 97/18028 | 5/1997 |
| WO | WO 01/30692 A3 | 5/2001 |
| WO | WO 2004/007358 A1 | 1/2004 |

OTHER PUBLICATIONS

D. C. Morrow & K. M. Lunsford, "Removal and Disposal of BTEX Components from Amine Plant Acid Gas Streams", 1997, pp. 171-173, 76$^{th}$ GPA Annual Convention, Tulsa, OK.

European Search Report No. RS 111796, dated Dec. 8, 2004, 5 pages.

PCT International Search Report and Written Opinion mailed Oct. 25, 2005, for PCT/US05/21915, 9 pages.

Response to PCT International Search Report and Written Opinion mailed Oct. 25, 2005, 15 pages.

PCT International Preliminary Report on Patentability, mailed Oct. 17, 2006, for PCT/US05/21915, 4 pages.

* cited by examiner

METHODS FOR REMOVING SULFUR-CONTAINING COMPOUNDS

CROSS REFERENCE TO RELATED APPLICATIONS

This application is the National Stage of PCT International Application PCT/US05/21915, filed 7 Dec. 2006 which claims the benefit of U.S. Provisional Application 60/587,223, filed 12 Jul. 2004.

BACKGROUND

1. Technical Field

Embodiments of the present inventions generally relate to methods for removing sulfur-containing compounds from streams containing hydrocarbons.

2. Description of Related Art

A reliable and cost effective gas purification system is essential to economic success for producing hydrocarbon gas streams such as natural gas. Sulfur removal is often the most difficult in terms of both recovery and cost due to tighter environmental regulations and product specifications. As such, sulfur removal processes have become more complicated and more capital intensive. There is a need, therefore, for improved sulfur removal processes that require less capital expenditure, less operating expenditure, and that provide better sulfur recovery to meet today's environmental specifications.

SUMMARY

Methods for removing sulfur-containing compounds are provided. Various specific embodiments are described below, at least some of which are also recited in the claims. In one embodiment, the method includes selectively separating a feed stream comprising carbon dioxide and one or more sulfur-containing compounds, including hydrogen sulfide, at conditions sufficient to produce a first stream comprising carbon dioxide and hydrogen sulfide and a second stream comprising carbon dioxide and hydrogen sulfide. A molar ratio of carbon dioxide to hydrogen sulfide in the first stream is greater than a molar ratio of carbon dioxide to hydrogen sulfide in the second stream, and a molar ratio of hydrogen sulfide in the first stream to hydrogen sulfide in the second stream is about 0.005 or more.

In another embodiment, the method includes selectively separating a feed stream comprising carbon dioxide and one or more sulfur-containing compounds, including hydrogen sulfide, at conditions sufficient to produce a first stream comprising carbon dioxide and hydrogen sulfide and a second stream comprising carbon dioxide and hydrogen sulfide. A molar ratio of carbon dioxide to hydrogen sulfide in the first stream is greater than a molar ratio of carbon dioxide to hydrogen sulfide in the second stream, and a molar ratio of hydrogen sulfide in the first stream to hydrogen sulfide in the second stream is about 0.005 or more. This method further includes passing the second stream to a sulfur recovery process to produce a tail gas stream, and bypassing the first stream around the sulfur recovery process to produce a bypassed stream.

In another embodiment, the method includes selectively separating a feed stream comprising carbon dioxide and one or more sulfur-containing compounds, including hydrogen sulfide, at conditions sufficient to produce a first stream comprising carbon dioxide and hydrogen sulfide and a second stream comprising carbon dioxide and hydrogen sulfide. A molar ratio of carbon dioxide to hydrogen sulfide in the first stream is greater than a molar ratio of carbon dioxide to hydrogen sulfide in the second stream, and a molar ratio of hydrogen sulfide in the first stream to hydrogen sulfide in the second stream is about 0.005 or more. This method further includes passing the second stream to a sulfur recovery process to produce a tail gas stream; bypassing the first stream around the sulfur recovery process to produce a bypassed stream; and capturing remaining sulfur-containing compounds from the tail gas stream and the bypassed stream.

In yet another embodiment, the method includes separating a feed stream comprising carbon dioxide and one or more sulfur-containing compounds, including hydrogen sulfide, at conditions sufficient to produce a first stream comprising carbon dioxide and hydrogen sulfide and a second stream comprising carbon dioxide and hydrogen sulfide. A molar ratio of carbon dioxide to hydrogen sulfide in the first stream is greater than a molar ratio of carbon dioxide to hydrogen sulfide in the second stream, and a molar ratio of hydrogen sulfide in the first stream to hydrogen sulfide in the second stream is about 0.005 or more. This method further includes capturing sulfur dioxide from the first stream, the second stream or both to produce a sulfur dioxide recycle stream, and splitting the sulfur dioxide recycle stream into two or more sequential catalytic reaction zones of a Claus process.

In still yet another embodiment, the method includes flashing at a pressure of less than 50 psig a feed stream comprising carbon dioxide and one or more sulfur-containing compounds, including hydrogen sulfide, to produce a first stream comprising carbon dioxide and hydrogen sulfide and a second stream comprising carbon dioxide and hydrogen sulfide. A molar ratio of carbon dioxide to hydrogen sulfide in the first stream is greater than a molar ratio of carbon dioxide to hydrogen sulfide in the second stream, and a molar ratio of hydrogen sulfide in the first stream to hydrogen sulfide in the second stream is about 0.005 or more. This method further includes passing the second stream to a sulfur recovery process to remove at least a portion of the one or more sulfur-containing compounds.

DETAILED DESCRIPTION

Introduction and Definitions

Figure 1:
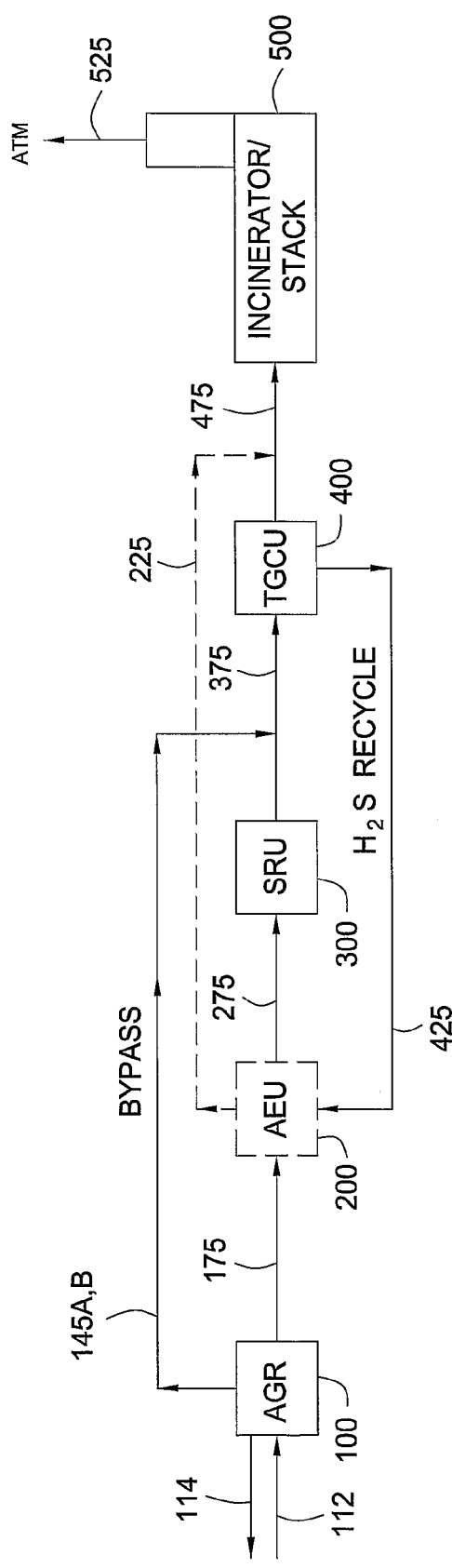
FIG. 1 schematically depicts a sulfur recovery process utilizing an acid gas recovery unit (AGR) 100, an optional acid gas enrichment unit (AEU), a sulfur recovery unit (SRU) 300, a tail gas cleanup unit (TGCU) 400 and an incinerator 500.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Various terms as used herein are defined below. To the extent a term used in a claim is not defined below, it should be given the broadest definition persons in the pertinent art have given that term as reflected in at least one printed publication or issued patent.

The term "gas" is used interchangeably with "vapor," and means a substance or mixture of substances in the gaseous state as distinguished from the liquid or solid state.

The term "acid gas" means any one or more of carbon dioxide ($CO_2$), hydrogen sulfide ($H_2S$), carbon disulfide ($CS_2$), carbonyl sulfide (COS), mercaptans (R—SH, where R is an alkyl group having one to 20 carbon atoms), sulfur dioxide ($SO_2$), combinations thereof, mixtures thereof, and derivatives thereof.

The term "sour gas" means a gas containing undesirable quantities of acid gas, e.g., 55 parts-per-million by volume (ppmv) or more, or 500 ppmv, or 5 percent by volume or more, or 15 percent by volume or more, or 35 percent by volume or more. At least one example of a "sour gas" is a gas having from about 2 percent by volume or more to about 7 percent by volume or more of acid gas.

The term "sweet gas" means a gas having no more than the maximum sulfur content defined by the specifications for the sales gas from a plant or the definition by a legal body, such as the Texas Railroad Commission for example. The term "sweet gas" includes a gas having no objectionable sulfur compounds, such as less than 21 ppmv of "sulfur-containing compounds" (measured as sulfur), for example, and no objectionable amount of carbon dioxide. For example, "sweet gas" has a maximum quantity of carbon dioxide such as less than 2% by volume for pipeline sales gas and 50 ppmv for Liquefied Natural Gas (LNG) manufacturing.

The term "rich solvent" means a solvent that contains a detectable amount of acid gas, e.g., acid gas that has been removed from a sour gas. For example, the term "rich solvent" includes a solvent having more than about 0.04 moles of acid gas per mole of pure solvent.

The term "lean solvent" means a solvent that contains a negligible amount of sour gas, or none at all. For example, the term "lean solvent" includes a solvent having less than 0.04 moles of acid gas per mole of pure solvent.

Specific Embodiments

Various specific embodiments are described below, at least some of which are also recited in the claims. For example, at least one specific embodiment is directed to a method for removing sulfur-containing compounds. In one embodiment, the method comprises selectively separating a feed stream comprising carbon dioxide and one or more sulfur-containing compounds, including hydrogen sulfide, at conditions sufficient to produce a first stream comprising carbon dioxide and hydrogen sulfide and a second stream comprising carbon dioxide and hydrogen sulfide. The molar ratio of carbon dioxide to hydrogen sulfide in the first stream is greater than the molar ratio of carbon dioxide to hydrogen sulfide in the second stream. Further, the molar ratio of hydrogen sulfide in the first stream to hydrogen sulfide in the second stream is about 0.005 or more, or about 0.01 or more, or about 0.1 or more.

At least one other specific embodiment is directed to selectively separating a feed stream comprising carbon dioxide and one or more sulfur-containing compounds, including hydrogen sulfide, at conditions sufficient to produce a first stream comprising carbon dioxide and hydrogen sulfide and a second stream comprising carbon dioxide and hydrogen sulfide. The molar ratio of carbon dioxide to hydrogen sulfide in the first stream is greater than the molar ratio of carbon dioxide to hydrogen sulfide in the second stream. The molar ratio of hydrogen sulfide in the first stream to hydrogen sulfide in the second stream is about 0.005 or more, or about 0.01 or more, or about 0.1 or more. The second stream is directed to a sulfur recovery process to produce a tail gas stream, and the first stream is bypassed around the sulfur recovery process to produce a bypassed stream.

Yet another other specific embodiment is directed to selectively separating a feed stream comprising carbon dioxide and one or more sulfur-containing compounds, including hydrogen sulfide, at conditions sufficient to produce a first stream comprising carbon dioxide and hydrogen sulfide and a second stream comprising carbon dioxide and hydrogen sulfide. The molar ratio of carbon dioxide to hydrogen sulfide in the first stream is greater than the molar ratio of carbon dioxide to hydrogen sulfide in the second stream, and the molar ratio of hydrogen sulfide in the first stream to hydrogen sulfide in the second stream is about 0.005 or more, or about 0.01 or more, or about 0.1 or more. The second stream passes to a sulfur recovery process to produce a tail gas stream, and the first stream bypasses around the sulfur recovery process to produce a bypassed stream. Remaining sulfur-containing compounds from the tail gas stream and the bypassed stream are then captured. Preferably, the remaining sulfur-containing compounds are captured by incinerating the tail gas and bypassed streams, scrubbing the incinerated streams, and passing a recycle gas stream consisting essentially of sulfur dioxide to the sulfur recovery process.

Yet another other specific embodiment is directed to selectively separating a feed stream comprising carbon dioxide and one or more sulfur-containing compounds, including hydrogen sulfide, at conditions sufficient to produce a first stream comprising carbon dioxide and hydrogen sulfide and a second stream comprising carbon dioxide and hydrogen sulfide. The molar ratio of carbon dioxide to hydrogen sulfide in the first stream is greater than the molar ratio of carbon dioxide to hydrogen sulfide in the second stream, and the molar ratio of hydrogen sulfide in the first stream to hydrogen sulfide in the second stream is about 0.005 or more, or about 0.01 or more, or about 0.1 or more. The method further includes capturing sulfur dioxide from the first stream, the second stream tail gas or both to produce a sulfur dioxide recycle stream, and splitting the sulfur dioxide recycle stream into two or more sequential catalytic reaction zones of a Claus process.

Yet another other specific embodiment is directed to flashing at a pressure of less than 70 psig a feed stream comprising carbon dioxide and one or more sulfur-containing compounds, including hydrogen sulfide, at conditions sufficient to produce a first stream comprising carbon dioxide and hydrogen sulfide and a second stream comprising carbon dioxide and hydrogen sulfide. The molar ratio of carbon dioxide to hydrogen sulfide in the first stream is greater than the molar ratio of carbon dioxide to hydrogen sulfide in the second stream, and the molar ratio of hydrogen sulfide in the first stream to hydrogen sulfide in the second stream is about 0.005 or more, or about 0.01 or more, or about 0.1 or more. The second stream is then passed to a sulfur recovery process to remove at least a portion of the one or more sulfur-containing compounds.

In one or more of the specific embodiments identified above, or elsewhere herein, the second stream may include 60 percent (%) by volume or more of the one or more sulfur-containing compounds of the feed. In one or more of the specific embodiments identified above, or elsewhere herein, the second stream includes at least 60% by volume of the hydrogen sulfide of the feed.

Further, in one or more of the embodiments identified above, or elsewhere herein, the first stream includes a plurality of streams. Preferably, a total of the plurality of streams contains at least 0.5% by volume of the one or more sulfur-containing compounds from the feed stream. Preferably, one or more of the plurality of streams comprises at least 51% by volume of carbon dioxide. Further, in one or more of the embodiments identified above, or elsewhere herein, the first stream contains at least 20% by volume of the carbon dioxide from the feed stream. Still further, in one or more of the specific embodiments identified above, or elsewhere herein, the second stream comprises about 50% by volume to about 99% by volume of hydrogen sulfide and the first stream comprises about 0.01% by volume to about 50% by volume of hydrogen sulfide.

In one or more of the specific embodiments identified above, or elsewhere herein, the feed stream is selectively separated by at least partially evaporating the feed stream in two or more stages. In one or more of the specific embodiments identified above, or elsewhere herein, the feed stream is selectively separated by at least partially flashing the feed stream in two stages wherein the first stage is operated at a higher pressure than the second stage. In one or more of the specific embodiments identified above, or elsewhere herein, the feed stream is selectively separated by at least partially flashing the feed stream in two stages wherein the first stage is operated at a pressure of about 75 psig to about 150 psig and the second stage is operated at about 10 psig to about 50 psig. In one or more of the specific embodiments identified above, or elsewhere herein, the feed stream is selectively separated by at least partially evaporating the feed stream in two or more stages and the first stream is an overhead gas stream from the flash separation.

In one or more of the specific embodiments identified above, or elsewhere herein, the feed stream is selectively separated by at least partially evaporating the feed stream in a single stage. In one or more of the specific embodiments identified above, or elsewhere herein, the feed stream is selectively separated by at least partially flashing the feed stream in a single stage operated at a pressure of about 20 psig to about 70 psig. In one or more of the specific embodiments identified above, or elsewhere herein, the feed stream is selectively separated by at least partially evaporating the feed stream in a single stage and the first stream is an overhead gas stream from this flash separation.

Specific Embodiments In Drawings

Specific embodiments shown in the drawings will now be described. It is emphasized that the claims should not be read to be limited to aspects of the drawings. FIG. 1 schematically depicts a sulfur recovery process for recovering greater than 98% by weight of total sulfur from a sour gas. This recovery process utilizes an acid gas recovery unit (AGR) 100, sulfur recovery unit (SRU) 300, a tail gas cleanup unit (TGCU) 400 and an incinerator 500. Optionally, this recovery process may utilize an acid gas enrichment unit (AEU) 200. The need for an AEU 200 depends on numerous design considerations not common to every sour gas to be treated. Some design considerations include, for example, sulfur concentrations and species within the sour gas to be treated, process conditions, emission standards, downstream equipment capacity and performance, as well as equipment availability.

Within the acid gas recovery unit (AGR) 100, a sour gas stream 112 having one or more sulfur-containing compounds is treated to remove the one or more sulfur-containing compounds and to produce a sweet gas stream 114. Preferably, the sour gas stream 112 is a hydrocarbon stream, such as natural gas or a refinery gas, for example. A sour gas stream 112 of natural gas may originate from one or more hydrocarbon production wells having both liquid and vapor phases in intimate contact that is run through a separator (not shown) to produce the sour gas 112 and a liquid "condensate". An example of such a sour gas stream 112 includes about 90% by volume to about 99% by volume of the hydrocarbon product, and about 2% by volume to about 10% by volume of acid gas and other impurities. Common impurities in the sour gas stream 112 which require further processing may include, but are not limited to, non-product water, oxygen, nitrogen, argon, helium, and hydrocarbons, such as butane, pentane, and aromatics, as well as other volatile organic compounds (VOCs). Illustrative aromatics include, but are not limited to, benzene, toluene, ethylbenzene and xylene.

The liquid condensate stream from the separator (not shown) should be stabilized in its vapor pressure to control emissions. The stabilized liquid may also be de-odorized to produce a marketable liquid hydrocarbon product suitable for sales specifications and an optional di-sulfide oil (DSO) stream for disposal as discussed below. The vapor liberated within this stabilization may be combined with the sour gas stream 112.

The acid gas and other impurities may be removed from the sour gas stream 112 using any separation process known in the art to produce a sweet gas stream 114. Preferably, the acid gas and other impurities are removed from the sour gas stream 112 in the AGR 100 using a solvent extraction process. The term "solvent extraction process" encompasses any process known in the art for extracting acid gases using a solvent. In at least one solvent extraction process, a lean solvent that is selective toward the acid gas and the other impurities contacts the sour gas stream 112 to remove or otherwise capture the acid gas and other impurities from the sour gas stream 112, producing the sweet gas stream 114 and a rich solvent.

This rich solvent (i.e., feed stream) having the captured acid gas and other impurities is selectively separated into a first stream 145A,B and a second stream 175 at processing conditions sufficient such that the first stream 145A,B has a greater molar ratio of carbon dioxide to hydrogen sulfide than the second stream. Further, the molar ratio of hydrogen sulfide in the first stream 145A,B to hydrogen sulfide in the second stream 175 is about 0.005 or more; or 0.01 or more; or 0.1 or more; or 0.25 or more; or 0.30 or more; or 0.5 or more. Still further, the first stream 145A,B may contain at least 20 volume %, or at least 50 volume %, or at least 70 volume %, or at least 80 volume %, or at least 90 volume % of the aromatic hydrocarbons and the mercaptans, carbon disulfide and carbonyl sulfide from the feed stream. Still further, the second stream 175 contains about 60% by volume or more of hydrogen sulfide from the feed stream. The first stream 145A,B may bypass around the SRU 300 and the second stream 175 may pass to the AEU 200, if utilized, or the SRU 300 for further processing. Also, if an AEU 200 is utilized, the first stream 145A,B may bypass both the AEU 200 and the SRU 300. The AEU 200 and SRU 300 will be described in more detail below.

The first stream 145A,B may include one or more streams or a plurality of streams. Preferably, a total of those streams contains at least 1%, at least 2%, at least 5%, at least 10%, or at least 20% by volume of the one or more sulfur-containing compounds from the feed stream. In one specific embodiment, one of the plurality of streams may contain up to 70%, up to 80% or up to 90 mole %, or up to 99.9 mole % of disulfide oil. This di-sulfide oil stream originating from the liquid condensate stabilization step described above. In another specific embodiment, one of the plurality of streams may contain up to 30%, up to 40% or up to 50%, or up to 60% by volume of mercaptans where these mercaptans were removed from the sweet gas stream 114 using one or more processing steps, not shown, but that may include one or more of absorption with a suitable solvent selective to mercaptans, adsorption of the mercaptans using, for example, a molecular sieve, or a combination of adsorption and absorption to generate a mercaptan stream or streams.

In one or more certain embodiments, the first stream 145A, B, whether a single stream or a plurality of streams, contains at least 20% by volume of carbon dioxide from the feed stream. In one or more certain embodiments, the first stream 145A,B, whether a single stream or a plurality of streams, contains at least 51% by volume of carbon dioxide, such as at least 60%, 70%, 80%, 90%, or 95% by volume. The second stream 175 is rich in the sulfur-containing compounds from the feed stream, preferably containing more than 51% by volume of the sulfur-containing compounds from the feed stream and more preferably containing more than 60% of the hydrogen sulfide from the feed stream. By selectively separating the carbon dioxide into the first stream 145A,B that bypasses the SRU 300, the total volume of carbon dioxide that must be processed by the SRU 300 is significantly reduced. Further, by selectively separating the aromatic hydrocarbons into the first stream 145A,B that bypasses the SRU 300, a greater amount of aromatic hydrocarbons and a greater amount of sulfur containing compounds other than hydrogen sulfide are directed around the SRU 300. This bypass, in addition to the increased concentration of sulfur-containing compounds in the second stream 175 allows a much smaller SRU 300 to efficiently recover basically the same amount of sulfur from a sour gas treatment operation of comparable size.

Acid Gas Recovery

Figure 2:
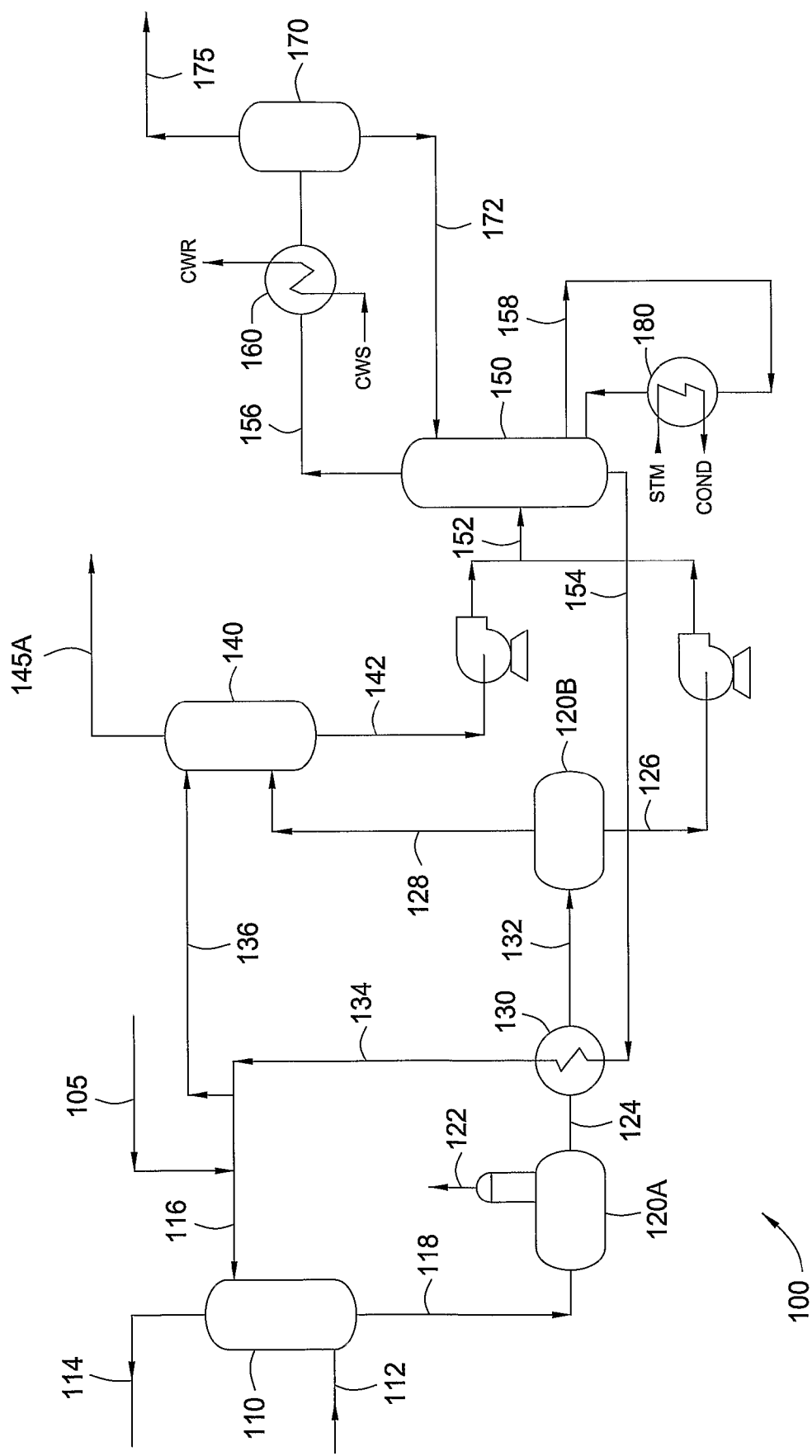
FIG. 2 schematically depicts an exemplary acid gas recovery unit (AGR) 100 according to certain specific embodiments described herein.

Considering the acid gas recovery unit (AGR) 100 in more detail, FIG. 2 schematically depicts an exemplary acid gas recovery unit (AGR) 100 according to certain specific embodiments described herein. The sour gas stream 112 can include between about 0.25% and 15% by volume of hydrogen sulfide, between about 0.5% and 30% by volume of carbon dioxide, between about 50 ppmv and 5000 ppmv of mercaptans and other sulfur containing compounds, and between about 50 ppmv and 1000 ppmv of aromatic hydrocarbons with 60% to 99% hydrocarbons which are alkyl and aromatic. Preferably, the natural gas stream 112 contains between 0.5% and 3% by volume of hydrogen sulfide, between about 2% and 7% by volume of carbon dioxide, between about 50 ppmv and 500 ppmv of mercaptans, between about 50 ppmv and 500 ppmv by volume of the other sulfur containing compounds (mercaptans, carbonyl sulfide, carbon disulfide).

The sour gas stream 112 is first passed into a contactor 110 where the sour gas stream 112 contacts a lean solvent stream 116. The contactor 110 can be an absorber tower or column, such as a bubble-tray tower having a plurality of horizontal trays (not shown) spaced throughout or contain a packing material for liquid vapor contacting. In operation, the incoming sour gas 112 can flow upward through the contactor 110 while the lean solvent flows 116 downward through the contactor 110. This is also known as counter-current flow. The contactor 110 is normally operated at a pressure of about 400 psig to about 1200 psig and a temperature of about 50° F. to about 140° F.

The lean solvent stream 116 is preferably one that will physically and/or chemically absorb, chemisorb, or otherwise capture the acid gases from the sour gas stream 112 upon contact. Accordingly, the sour gas stream 112, after contact with the lean solvent 116, is devoid or substantially devoid of the acid gases. Preferably, the lean solvent stream 116 contains less than 0.4 mole % of acid gas (e.g. less than 0.04 moles of acid gas per mole of pure solvent subject to the partial pressures of acid gases in the sour gas stream 112 and the solvent selected)

Illustrative solvents include, but are not limited to, alkanolamines, aromatic amines, diamines, sterically hindered amines, mixtures thereof or derivatives thereof. Specific amines include monoethanolamine (MEA), diethanolamine (DEA), diglycolamine, methyldiethanolamine (MDEA; with and without activator), di-isopropanolamine (DIPA), triethanolamine (TEA), and dimethylaniline, for example. Other suitable solvents may include, for example, polyethylene glycol and derivatives thereof, carbonates, sulfites, nitrites, caustics, and N-methyl-2-pyrrolidone (NMP), either alone or in combination with the amines listed above. This description is based on the use of MDEA solvent.

The sweetened gas stream exits the top of the contactor 110 as a sweet gas stream 114 while the solvent exits the bottom of the contactor 110 as a rich solvent stream 118. The rich solvent stream 118 includes substantially all of the acid gases and a portion of the hydrocarbons that were present in the sour gas stream 112. A small percentage of the acid gas may remain in the sweet gas stream 114 which contains the majority of the hydrocarbons. The small percentage of the acid gas of the sweet gas stream 114 is less than 3% by volume, and can be as low as parts per million by volume (ppmv) range. For example, the sweet gas stream 114 may contain at least 99% by volume of natural gas and less than 1% by volume of acid gas.

The rich solvent stream 118 can include 80 mole % to 99 mole % of solvent and water and about 1 mole % to 9 mole % of acid gas and hydrocarbons (subject to the partial pressures of acid gases in the sour gas stream 112 as well as the solvent selected). More specifically, a typical rich solvent stream 118 includes about 0.1 mole % to 9 mole % of sulfur-containing compounds and 1 mole % to 10 mole % of carbon dioxide. In one or more specific embodiments, the concentration of sulfur-containing compounds ranges from a low of 0.5 mole %, or 1.0 mole %, or 1.5 mole % to a high of 1 mole %, or 2 mole %, or 3 mole %. In one or more specific embodiments, the concentration or carbon dioxide ranges from a low of 1 mole %, or 2 mole %, or 3 mole % to a high of 4 mole %, or 5 mole %, or 6 mole %.

Of the sulfur-containing compounds, the rich solvent stream 118 can include about 0.1 mole % to 9 mole % of hydrogen sulfide and between about 10 mole ppm to 1,000 mole ppm of "other sulfurs" such as mercaptans, carbonyl sulfide and carbon disulfide. In one or more specific embodiments, the concentration of hydrogen sulfide ranges from a low of 0.1 mole %, or 0.5 mole %, or 1.0 mole % to a high of 2.0 mole %, 3.0 mole %, or 5.0 mole %. In one or more specific embodiments, the concentration of other sulfurs (mercaptans, carbonyl sulfide and carbon disulfide) ranges from a low of 10 mole ppm, or 25 mole ppm, or 50 mole ppm to a high of 200 mole ppm, 400 mole ppm, or 1,000 mole ppm.

An illustrative rich solvent stream 118 may also include 0.01 mole % to 0.5 mole % of hydrocarbons, including alkyl hydrocarbons and aromatic hydrocarbons. For example, an illustrative rich solvent stream 118 has a ratio of moles of hydrocarbons to acid gases in the rich solvent which may include 1 mole % to 10 mole % of alkyl hydrocarbons and 100 mole ppm to 10,000 mole ppm of aromatic hydrocarbons. In one or more specific embodiments, the ratio of moles of alkyl hydrocarbons to acid gases in the rich solvent ranges from a low of 1 mole %, or 2 mole %, or 3 mole % to a high of 2 mole %, 3 mole %, or 5 mole %. In one or more specific embodiments, the ratio of moles of aromatic hydrocarbons to acid gases in the rich solvent ranges from a low of 100 ppm, or 200 ppm, or 400 ppm to a high of 400 ppm, 800 ppm, or 1200 ppm. Exemplary alkyl hydrocarbons in the rich solvent stream 118 may include one or more of methane, ethane, propane, butane, pentane, and other alkyl hydrocarbons having 6 or more carbon atoms. Illustrative aromatic hydrocarbons may include benzene, toluene, ethylbenzene and xylene.

An illustrative rich solvent stream 118 may further include less than 10 mole % or less than 1 mole %, or less than 0.1 mole %, or less than 500 mole ppm of nitrogen and other inerts. In one or more specific embodiments, the ratio of moles of nitrogen to acid gases in the rich solvent ranges from a low of 200 ppm, or 400 ppm, or 600 ppm to a high of 400 ppm, or 600 ppm, or 1000 ppm. In one or more specific embodiments, the ratio of moles of other inerts to the acid gases in the rich solvent ranges from a low of 300 ppm, or 400 ppm, or 500 ppm to a high of 500 ppm, or 600 ppm, or 800 ppm. The term "other inerts," as used herein, refers to non-sulfur containing compounds, non-carbon dioxide compounds, and non-hydrocarbon compounds, which may include, but are not limited to, nitrogen, oxygen, argon, hydrogen, water, and carbon monoxide.

The rich solvent stream 118 can be regenerated and reused in the treatment process. For example, the captured acid gas and hydrocarbons can be removed or substantially reduced before the solvent 118 is recycled and reused in the contactor 110. In one embodiment, the rich solvent stream 118, hereinafter referred to as a "feed stream" is selectively separated by passing the stream 118 to a first flash tank 120A. Preferably, the operating pressure of the first flash tank 120A is about 150 psig or less, such as between about 75 psig and about 100 psig. The operating temperature in first flash tank 120A is the same as that of the incoming feed stream 118, such as about 80° F. to about 190° F. In this first flash step, substantially all of the alkyl hydrocarbons in the feed stream 118 are "flashed off" and recovered through line 122. As will be understood, these hydrocarbons can be compressed and used as fuel or can otherwise be disposed.

The feed stream having the majority of alkyl hydrocarbons removed exits the first flash tank 120A as stream 124. Stream 124 includes about 0.1 mole % to 9 mole % of sulfur-containing compounds and 1 mole % to 9 mole % of carbon dioxide and molar ratios of 1000 ppm to 10,000 ppm for hydrocarbons, including alkyl hydrocarbons and aromatic hydrocarbons, relative to the acid gases content in the rich solvent. In one or more specific embodiments, the concentration of sulfur-containing compounds ranges from a low of 0.5 mole %, or 1.0 mole %, or 1.5 mole % to a high of 1 mole %, or 2 mole %, or 3 mole %. Of the sulfur-containing compounds, the stream 124 can include about 0.1 mole % to 9 mole % of hydrogen sulfide. In one or more specific embodiments, the concentration of hydrogen sulfide ranges from a low of 0.1 mole %, or 0.5 mole %, or 1.0 mole % to a high of 2.0 mole %, 3.0 mole %, or 5.0 mole %. In one or more specific embodiments, the concentration of carbon dioxide ranges from a low of 1 mole %, or 2 mole %, or 3 mole % to a high of 4 mole %, or 5 mole %, or 6 mole %. In one or more specific embodiments, the molar ratio of alkyl hydrocarbons to acid gases in the rich solvent ranges from a low of 1000 ppm, or 2000 ppm, or 3000 ppm to a high of 3000 ppm, 5000 ppm, or 6000 ppm. In one or more specific embodiments, the molar ratio of aromatic hydrocarbons to acid gases in the rich solvent ranges from a low of 100 ppm, or 200 ppm, or 400 ppm to a high of 500 ppm, 600 ppm, or 1000 ppm.

Next, stream 124 flows through a heat exchanger 130 where it is heated, such as by a regenerated solvent stream 154 as will be further explained below. Alternatively, the stream 124 may be heated using a resistive heater, steam or other heat transfer medium within the processing facility as is well known in the art. Within the heat exchanger 130, the temperature of the stream 124 is raised to a relatively high temperature, such as about 200° F. to about 300° F., preferably between about 210° F. and about 240° F., to produce a heated stream 132 exiting the heat exchanger 130.

The stream 132 flows into a low-pressure, second flash tank 120B which is designed to operate at very low pressures, such as about 50 psig or less. Preferably, the second flash tank 120B is operated at about 10 psig to about 25 psig. The operating temperature of the second flash tank 120B is about that of the stream 132, such as about 210° F. and about 240° F. At these temperatures and pressures, at least 20% or more of the carbon dioxide in the rich solvent stream 118 is flashed off and recovered through an overhead gas stream 128, and a liquid solvent stream 126 is recovered from the bottom of the flash tank 120B.

The liquid solvent stream 126 can include about 80 mole % to 99 mole % of solvent and water, 0.1 mole % to 9 mole % of carbon dioxide, 0.1 mole % to 9 mole % of sulfur-containing compounds. Of the sulfur-containing compounds, the liquid solvent stream 126 can include about 0.1 mole % to 9 mole % of hydrogen sulfide and between about 50 to 1000 mole ppm of "other sulfurs" such as mercaptans, carbonyl sulfide and carbon disulfide. Further, the liquid solvent stream 126 can include of from 60 mole % to 99 mole % of the sulfur-containing compounds of the feed stream 118 and 5 mole % to 99 mole % of the carbon dioxide of the feed stream 118. Preferably, the liquid solvent stream 126 can include of from 60 mole % to 99 mole % of the hydrogen sulfide of the feed stream 118.

The overhead gas stream 128 can include at least 20% by volume or more of the carbon dioxide in the rich solvent stream 118. Preferably, the overhead gas stream 128 can include at least 20% by volume, at least 30% by volume, at least 40% by volume, at least 60% by volume, at least 70% by volume or more of the carbon dioxide in the rich solvent stream 118. In one or more specific embodiments, the concentration of carbon dioxide in the overhead gas stream 128 ranges from a low of 30% by volume, or 40% by volume, or 50% by volume to a high of 50% by volume, 70% by volume, or 90% by volume. The overhead gas stream 128 is likely to further contain a substantial amount of hydrogen sulfide and other sulfurs (mercaptans, carbonyl sulfide, carbon disulfide), such as up to 1%, up to 2%, up to 5%, up to 10%, up to 15%, up to 20%, up to 25%, up to 30%, or up to 55% by volume. In one or more specific embodiments, the concentration of hydrogen sulfide ranges from a low of 5%, or 15%, or 25% by volume to a high of 15%, 25%, or 50% by volume. For example, a typical overhead gas stream 128 includes between about 50% to 80% by volume of carbon dioxide, 10% to 25% by volume of hydrogen sulfide, and 2% to 10% by volume of nitrogen and other inerts.

In one or more specific embodiments, the overhead gas stream 128 can include about 5% to 50% by volume of hydrogen sulfide, 30% to 99% by volume of carbon dioxide, 0.1% to 10% by volume of nitrogen and other inerts, and 0.1% to 20% by volume of hydrocarbons. In one or more specific embodiments, the overhead gas stream 128 can include of from 1% to 90% of the total sulfur compounds, and 40% to 99% by volume of the carbon dioxide and 0.1% to 90% by volume of the hydrocarbons of the stream 132.

The sulfur-containing compounds, primarily hydrogen sulfide, in the overhead gas stream 128 are removed or reduced from the overhead gas stream 128 before the carbon dioxide of the overhead gas stream 128 can be disposed. Accordingly, the overhead gas stream 128 passes to a low pressure contactor 140 operated at a pressure of about 5 psig to about 25 psig. In one or more specific embodiments, the operating temperature of the contactor 140 is between about 60° F. and 140° F., such as between 100° F. and 120° F. In one or more specific embodiments, the operating temperature ranges from a low of 60° F., or 80° F., or 100° F. to a high of 100° F., 120° F., or 140° F.

Within the low pressure contactor 140, a second lean solvent stream 136, preferably a side stream of the regenerated solvent 154 as shown in FIG. 2, flows through the contactor 140 to absorb the hydrogen sulfide from the overhead gas stream 128. The second solvent stream 136 and the absorbed hydrogen sulfide flows from the contactor 140 through line 142 and merges with the solvent stream 126 to form stream 152.

The contactor overhead stream 145A contains a substantial amount of the carbon dioxide, and hydrocarbons flashed from the feed stream 118. For example, the overhead stream 145A may contain between about 50% and 99% by volume of the carbon dioxide entering the contactor 140. In one or more specific embodiments, the concentration of carbon dioxide ranges from a low of 60%, or 70%, or 80% by volume to a high of 80%, 90%, or 99% by volume. Accordingly, the overhead stream 145A has a molar ratio of carbon dioxide to hydrogen sulfide of at least 2:1, such as between 2:1 and 6000:1. In one or more specific embodiments, the molar ratio of carbon dioxide to hydrogen sulfide of the stream 145A may be at least 2:1, 3:1, 5:1, 10:1, 50:1, 100:1, 200:1, 500:1, or 1,000:1. Moreover, the overhead stream 145A may contain about 20 mole % to 99 mole % of the carbon dioxide of the feed stream 118, and about 250 ppmv to 40 mole % of the hydrogen sulfide of the feed stream 118. In one or more specific embodiments, the overhead stream 145A may contain at least 1 mole %, 2 mole %, 3 mole %, 5 mole %, 10 mole %, or 20 mole % of the hydrogen sulfide of the feed stream 118. Relative to the feed stream 118, the overhead stream 145B can include between about 30 mole % and 99 mole % of mercaptans, carbonyl sulfide and carbon disulfide, and between about 10 mole % and 90 mole % of aromatic hydrocarbons.

In certain situations, the overhead stream 145A may be able to bypass the SRU 300 or the TGCU 400 or both, depending on the sulfur content of the stream 145A. For example, the contactor 140 may be sized such that a greater amount of sulfur is removed from the gas stream 128 leaving a small amount in the overhead stream 145A. The size of the contactor 140 is proportional to the amount of sulfur removed from the flash drum overhead steam 128. Accordingly, the larger the contactor 140, the greater the amount of sulfur removed and the less amount of sulfur in the overhead stream 145A allowing the overhead stream 145A to bypass the TCGU 400 and pass directly to the incinerator 500. Otherwise, the overhead stream 145A is bypassed to the TGCU 400 as shown in FIG. 1, and will be described in further detail below. Hence, the overhead stream 145A will be hereinafter referred to as "the bypass stream 145A."

Figure 3:
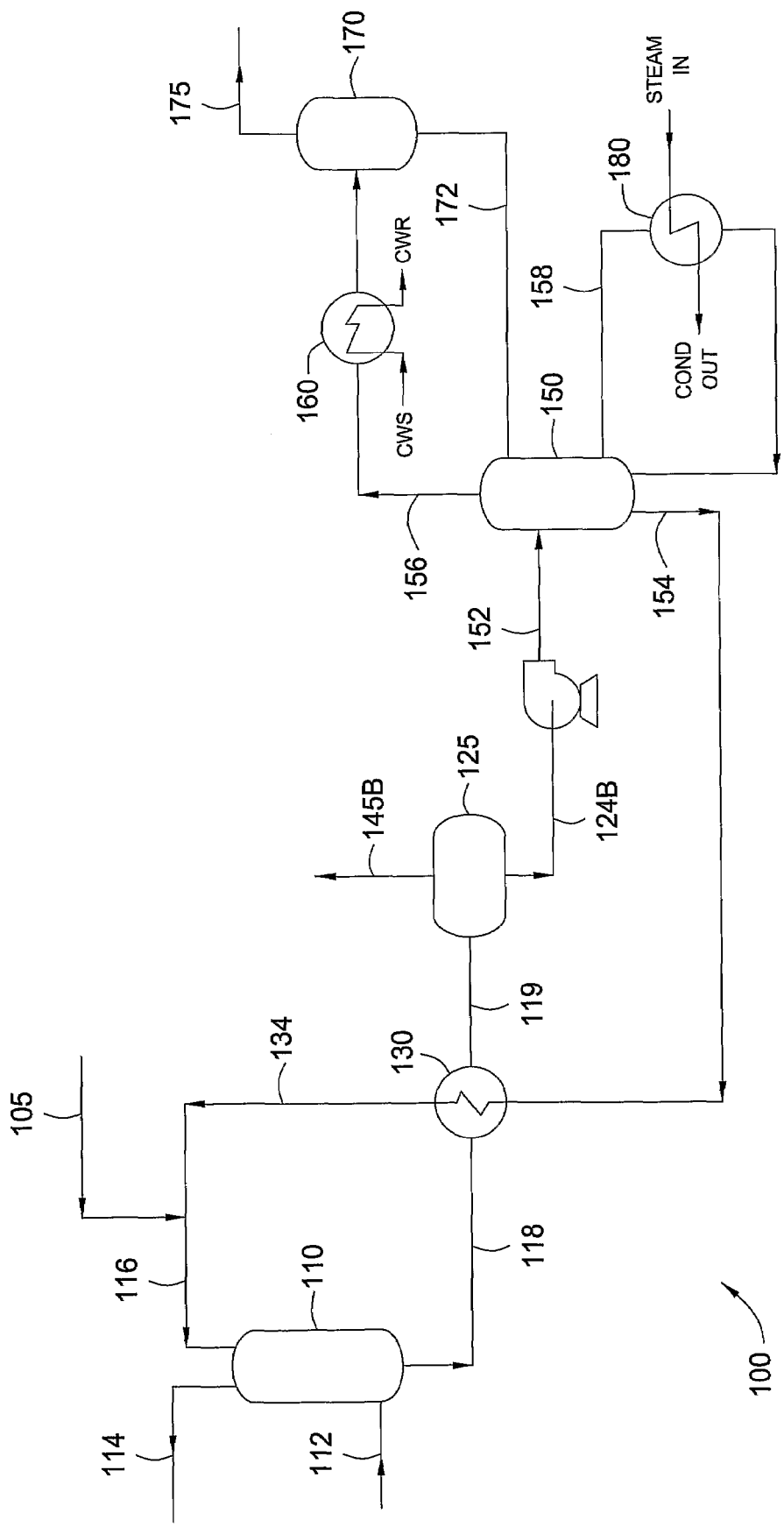
FIG. 3 illustrates at an alternative, exemplary acid gas recovery unit (AGR) 100 according to certain specific embodiments described herein.

FIG. 3 illustrates at least one other method of recovering acid gas from a feed stream 118. In this embodiment, the feed stream 118 may be selectively separated by passing the feed stream 118 directly to the heat exchanger 130 and heating the stream 118 using the regenerated solvent 154 or an alternative heat transfer medium, such as stream. Preferably, the feed stream 118 is heated to a relatively high temperature to produce a heated feed stream 119 having a temperature between about 100° F. to about 300° F., more preferably between about 200° F. to about 240° F.

The heated feed stream 119 is then flashed at a low pressure in a flash drum 125. In one or more specific embodiments, the stream 119 is flashed at a pressure between about 5 psig to about 150 psig. For example, the stream 119 may be flashed at a pressure of about 20 psig to about 70 psig, such as about 40 psig. Preferably, the stream 119 is flashed in a single stage, meaning at one pressure or flashed within a narrow pressure range that may fluctuate, depending on processing conditions, by plus or minus 10 psig. For example, a single stage flash having a target pressure of 40 psig includes a single stage flash operating within the range of 30 psig and 50 psig.

At these process conditions, at least a portion of the hydrocarbons and carbon dioxide in the feed stream is "flashed off" in addition to some amount of the hydrogen sulfide. These volatile components at the temperature and pressure of the flash are removed from the flash drum 125 and recovered through a flash overhead stream 145B. The non-volatile components at the conditions of the flash remain with the liquid solvent from the feed stream 118 and are recovered in liquid stream 124.

The flash overhead stream 145B can include between about 30% and 99% by volume of carbon dioxide; between about 0.001% and 50% by volume of hydrogen sulfide, between about 10 ppmv and 10% by volume of alkyl and aromatic hydrocarbons, and between 10 ppmv and 10% by volume of mercaptans, carbonyl sulfide and carbon disulfide. Preferably, the flash overhead stream 145B contains between 50% and 99% by volume of carbon dioxide, between about 0.001% and 35% by volume of hydrogen sulfide, between about 0.001% and 10% by volume of all other sulfur containing compounds (mercaptans, carbonyl sulfide, carbon disulfide). Relative to the feed stream 118, the flash overhead stream 145B can include between about 0.1 mole % and 40 mole % of the hydrogen sulfide, between about 30 mole % and 99 mole % of the mercaptans, carbonyl sulfide and carbon disulfide, between about 10 mole % and 99 mole % of the carbon dioxide, and between about 10 mole % and 90 mole % of the aromatic hydrocarbons. In one or more specific embodiments, the flash overhead stream 145A may contain at least 1 mole %, 2 mole %, 3 mole %, 5 mole %, 10 mole %, or 20 mole %, or 30 mole %, or 40 mole % of the hydrogen sulfide of the feed stream 118. Similar to the flash overhead stream 145A, the flash overhead stream 145B may bypass the SRU 300 or the TCGU 400, or bypass both depending on the feed stream 118 composition as discussed above with reference to FIG. 1.

The liquid solvent stream 124B leaving the flash drum 125 can include between about 80 mole % and 99 mole % of solvent and water, between about 0.1 mole % to 9 mole % of carbon dioxide, 0.1 mole % to 9 mole % of sulfur-containing compounds. Of the sulfur-containing compounds, the liquid solvent stream 124B can include about 0.1 mole % to 9 mole % of hydrogen sulfide and between about 50 mole ppm to 1000 mole ppm of "other sulfurs," such as mercaptans, carbonyl sulfide and carbon disulfide for example. Preferably, the liquid solvent stream 124B contains between 0.1 mole % and 5 mole % of carbon dioxide and between about 0.5 mole % and 5 mole % of hydrogen sulfide. Relative to the feed stream 118, the liquid solvent stream 124B can include from 60 mole % to 99 mole % of the sulfur-containing compounds of the feed stream 118 and 5 to 99 mole % of the carbon dioxide of the feed stream 118. Preferably, the liquid solvent stream 124B can include of from 60 mole % to 99 mole % of the hydrogen sulfide of the feed stream 118 and between 10 mole % to 90 mole % of the hydrocarbons. Next, the liquid solvent stream 124B can be boosted in pressure sufficient to pass stream 152 through a regenerator stripper 150.

Referring to FIGS. 2 and 3, the liquid solvent streams 152 to be regenerated are passed through the regenerator stripper 150 to remove remaining acid gas. The stripper 150 is equipped with a reboiler 180 for adding additional heat to the solvent stream 158 and is designed to operate at relatively high temperatures, such as about 250° F. to about 270° F., and relatively low pressures such as about 20 psig or less. Substantially all of the hydrogen sulfide and most of the remaining carbon dioxide are stripped out of the liquid solvent streams 152. For example, the regenerated solvent stream 154 leaving the stripper 150 contains about 0.033 moles of acid gas per mole of pure solvent. In other words, the regenerated solvent stream 154 is now a lean solvent and ready to be recycled to the contactor 110.

The regenerated solvent stream 154 flows from the bottom of the stripper 150 and is recycled to the contactor 110. The regenerated solvent is cooled before reentering the contactor 110 by passing it through the heat exchanger 130 where it gives up heat to the rich solvent stream 124 (FIG. 2) or stream 118 (FIG. 3) exiting the contactor 110, as described above. Additional coolers (not shown) may be used, if needed, to further cool the regenerated solvent stream 154. The regenerated solvent stream 154 exits the one or more heat exchangers as cooled lean solvent stream 134 prior to entering the contactor 110 as stream 116. Additional fresh lean solvent 105 may be added directly to the contactor 110 or added to the recycled solvent stream 134.

Referring again to the stripper 150, an overhead gas stream 156 passes from the top of the stripper 150 through a cooler 160 to a reflux separator 170. Any liquids, predominantly water, that are condensed in the reflux separator 170 are returned through line 172 to the stripper 150 as reflux. The overhead gas from the separator 170 is recovered through stream 175 and is passed on to an Acid Gas Enrichment Unit (200) or a Sulfur Recovery Unit (SRU) 300, as described below in further detail with reference to FIG. 1.

The overhead stream 175 can include between about 20% and 99% by volume of hydrogen sulfide, between about 10% and 80% by volume of carbon dioxide, and between about 0.1% and 5% by volume of hydrocarbons. Preferably, the stream 175 contains between 25% and 85% by volume of hydrogen sulfide, and between about 10% and 70% by volume of carbon dioxide. Relative to the feed stream 118, the stream 175 can include between about 60% and 100% by volume of hydrogen sulfide, between about 5% and 100% by volume of carbon dioxide, and between about 60% and 100% by volume of sulfur containing compounds. In one or more specific embodiments, the stream 175 may contain at least 60%, or 66%, or 67%, or 70%, or 80%, or 90%, or 99% by volume of the hydrogen sulfide of the feed stream 118. In one or more embodiments, the molar ratio of carbon dioxide to hydrogen sulfide of the stream 175 may be less than 4:1, 3:1, 2.3:1, 2:1, 1:1, 0.5:1, or 0.1:1.

Acid Gas Enrichment Unit (AEU)

Referring again to FIG. 1, the acid gas stream 175 may be subjected to a second absorption process that is more selective toward hydrogen sulfide prior to passing the acid gas stream 175 to the SRU 300. Any typical acid gas enrichment process may be used. For example, an MDEA solvent as described above with reference to the AGR 100 may be used except that the contactor 100 is operated at lower pressure. Such selective absorption techniques are well known in the art and include Flexsorb and Flexsorb SE (sterically hindered amines) commercially available from ExxonMobil Research and Engineering, located in Fairfax, Va.

An AEU tail gas 275 can include between about 40% and 90% by volume of hydrogen sulfide, between about 10% and 60% by volume of carbon dioxide, between about 0.1 and 5% by volume of hydrocarbons, mercaptans, carbonyl sulfide and carbon disulfide from the gas stream 112. Preferably, the AEU tail gas 275 can include between about 50% and 85% by volume of hydrogen sulfide, between about 25% and 50% by volume of carbon dioxide, between about 0.1 and 1% by volume of hydrocarbons, mercaptans, carbonyl sulfide and carbon disulfide from the gas stream 112. Relative to the feed stream 118, the AEU tail gas 275 can include between about 60 mole % and 99.9 mole % of the hydrogen sulfide, between about 5 mole % and 60 mole % of the carbon dioxide, between about 1 mole % and 30 mole % of the hydrocarbons, mercaptans, carbonyl sulfide and carbon disulfide An AEU offgas stream 225 can include between about 100 ppmv and 10% by volume of hydrogen sulfide, between about 70% and 99% by volume of carbon dioxide, between about 400 ppmv and 5% by volume of mercaptans, carbonyl sulfide and carbon disulfide Preferably, the AEU offgas stream 225 can include between about 1% and 10% by volume of hydrogen sulfide, between about 70% and 99% by volume of carbon dioxide, between about 1000 ppmv and 5% by volume of mercaptans, carbonyl sulfide and carbon disulfide. Relative to the feed stream 118, the AEU offgas stream 225 can include between about 0.1% and 30% by volume of the hydrogen sulfide, between about 30% and 90% by volume of the carbon dioxide, between about 1% and 99% by volume of the mercaptans, carbonyl sulfide and carbon disulfide and between 1% to 99% by volume of the hydrocarbons.

Sulfur Recovery Unit (SRU)

Still referring to FIG. 1, the sulfur recovery unit 300 preferably performs a Claus process although any sulfur recovery process may be utilized. Generally, the Claus process produces elemental sulfur from hydrogen sulfide and has two major sections. The first section is a thermal section where hydrogen sulfide is converted to elemental sulfur at approximately 1,800° F. to 2,800° F. No catalyst is present in the thermal section. The second section is a catalytic section where elemental sulfur is produced at temperatures between 400° F. and 950° F., for example, over a catalyst, such as an alumina catalyst, within one or more reaction zones. The catalytic reaction to produce elemental sulfur is an equilibrium reaction; hence, there are several stages in the Claus process where separations are made in an effort to enhance the overall conversion of hydrogen sulfide to elemental sulfur. Each stage involves heating, reacting, cooling and separation.

In the thermal section of the conventional Claus plant, a stoichiometric amount of air ($O_2$) is added to the furnace to oxidize approximately one-third of the hydrogen sulfide to sulfur dioxide and also to burn all the hydrocarbons and any ammonia ($NH_3$) present in the feed stream 275. The primary oxidation reaction is represented as follows:

$$2H_2S + 3O_2 \rightarrow 2SO_2 + 2H_2O \quad (1)$$

Reaction (1) is highly exothermic and not limited by equilibrium. In the reaction furnace, the unconverted hydrogen sulfide reacts with the sulfur dioxide to form elemental sulfur. This reaction is represented as follows:

$$2H_2S + SO_2 \leftrightarrow 3/xS_x + 2H_2O \quad (2)$$

In the catalytic section of the Claus process, the unconverted hydrogen sulfide and sulfur dioxide from the thermal stage are converted to sulfur by the Claus reaction (2) over catalyst (typically alumina) within one or more reaction zones or stages. This reaction is also highly exothermic. In one embodiment, there are two stages of catalytic conversions where the reaction is equilibrium limited and the equilibrium to elemental sulfur is favored at lower temperatures. As such, the unconverted hydrogen sulfide is cooled between each stage. The overall Claus process conversion can be represented as follows:

$$3H_2S + 3/2O_2 \rightarrow 3/xS_x + 3H_2O \quad (3)$$

The Claus process generates a tail gas 375 which may contain unreacted hydrogen sulfide, sulfur dioxide, mercaptans as well as carbon dioxide, water vapor and nitrogen. As such, this tail gas 375 may require further treating to meet the sulfur emission environmental standards. To meet these standards, the tail gas 375 is processed within the Tail Gas Cleanup Unit (TGCU) 400.

The tail gas 375 can include between about 0.1% and 10% by volume of hydrogen sulfide, between about 0.05% and 5% by volume of sulfur dioxide, between about 10% and 99% by volume of inert. Preferably, the tail gas 375 contains between about 0.1% and 3% by volume of hydrogen sulfide, between about 0.05% and 2% by volume of sulfur dioxide, between about 70% and 99% by volume of inert. Relative to the feed stream 118, the tail gas 375 can include between about 0.1 mole % and 10 mole % of sulfur containing compounds.

Tail Gas Cleanup Unit

Common tail gas cleanup units 400 utilize dry bed processes to oxidize the sulfur-containing compounds of the tail gas 375 to elemental sulfur. Other common dry bed processes extend the Claus reaction on a solid bed. Common tail gas cleanup units 400 also include wet scrubbing processes that extend the Claus reaction in liquid phase with a catalyst; or oxidize the sulfur-containing compounds of the tail gas 375 to sulfur dioxide; or reduce the sulfur-containing compounds of the tail gas 375 to hydrogen sulfide by hydrogenation, hydrolysis, or a combination of both.

For example, a SCOT® cleanup process provided by Shell Oil Company, has been widely used in tail gas cleanup service. Generally in this process, hydrogen sulfide, along with some level of carbon dioxide, is absorbed into a solvent. The solvent is more selective for hydrogen sulfide than carbon dioxide, and is MDEA for example. After contact with the tail gas 375, the rich solvent is regenerated and the hydrogen sulfide is recycled to the front of the sulfur recovery unit 300 as stream 425 for further processing. The tail gas stream 475 from the TGCU 400 is passed to the incinerator 500 for disposal.

The tail gas 475 can include between about 100 and 10,000 ppmv of sulfur containing compounds. Relative to the feed stream 118, the tail gas 475 can include between about 0.1 mole % and 5 mole % of the sulfur containing compounds.

Incinerator

The tail gas stream 475 from the TGCU 400 can include nitrogen, carbon dioxide, water, carbon monoxide hydrogen, hydrogen sulfide, sulfur oxides, carbonyl sulfide, carbon disulfide, sulfur vapor, hydrocarbons (both alkyl and/or aromatics) and entrained liquid sulfur.

The incinerator 500 operates at a temperature at or above 1,100° F. to thermally oxidize the sulfur-containing compounds of the tail gas 475 to sulfur oxides, preferably sulfur dioxide. In one embodiment, air is introduced into the incinerator 500 to provide at least stoichiometric amount of oxygen sufficient to convert the sulfur-containing compounds to sulfur dioxide and the hydrocarbon compounds to carbon dioxide.

The tail gas stream 475 is thermally incinerated at a temperature above 1,100° F. in the presence of excess oxygen to convert sulfur and sulfur-containing compounds to sulfur oxides, preferably sulfur dioxide. In one embodiment, air is introduced into the incinerator 500 to provide an amount of oxygen sufficient to convert the sulfur-containing compounds to sulfur dioxide. The fuel required for thermal incineration is determined by the amount of heat needed to heat the tail gas stream 475 and the air to the required temperature. Normally the incinerator is sized for at least 0.5 seconds residence time, and sometimes for as much as 1.5 seconds residence time. Generally, the longer the residence time, the lower the incinerator temperature needed to meet the environmental regulations. The effluent stream containing permissible amounts of sulfur dioxide is vented via an elevated stack to the atmosphere as stream 525 or further processed in a wet scrubber (not shown).

Figure 4:
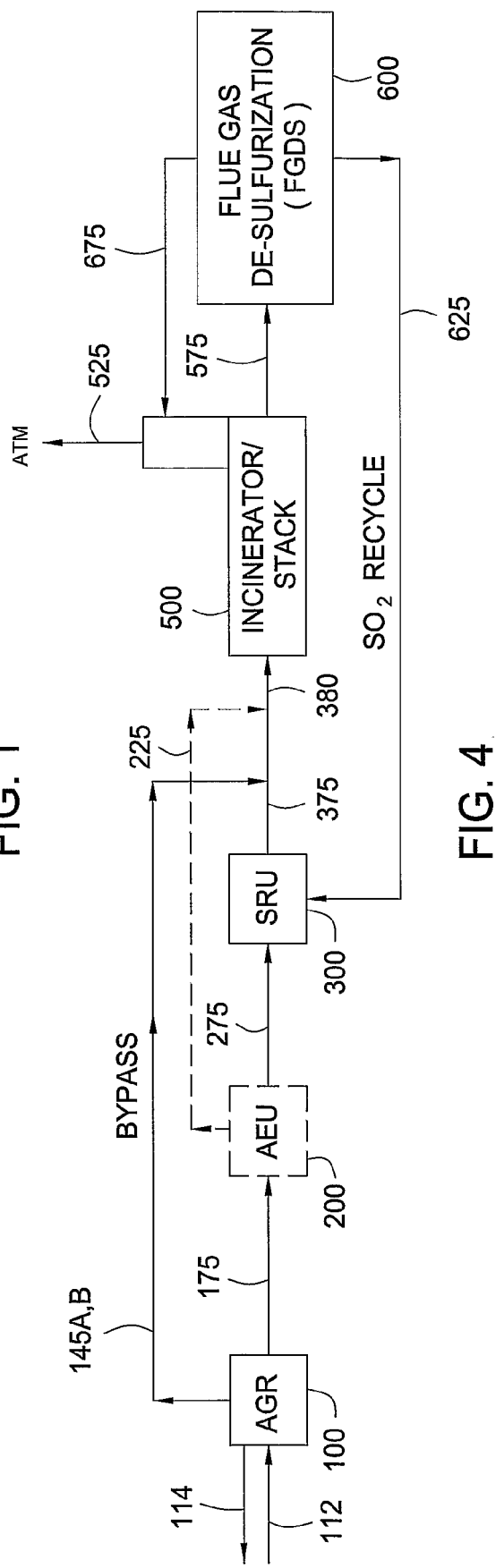
FIG. 4 schematically depicts another alternative embodiment of a sulfur recovery process which utilizes a flue gas de-sulfurization unit (FGDS) 600.

FIG. 4 schematically depicts another embodiment of a sulfur recovery process which utilizes a flue gas de-sulfurization unit (FGDS) 600. In this embodiment, the AGR 100, the AEU 200, and the SRU 300 operate in the same manner as described above, except that the tail gas 375 from the SRU, the bypass 145A,B from the AGR 100, and the bypass 225 from the AEU 225 combine to form stream 380 that passes directly to the incinerator 500. This combined stream 380 is thermally oxidized within the incinerator 500 to convert the sulfur-containing compounds to sulfur oxides, preferably sulfur dioxide and the hydrocarbons to carbon dioxide. A tail gas 575 from the incinerator 500 containing these sulfur oxides passes to the FGDS 600. The FGDS 600 selectively captures sulfur oxides from the tail gas 575 and recycles the sulfur oxides to the SRU 300 as stream 625. A FGDS 600 tail gas stream 675 is then passed to the incinerator 500 and released to the atmosphere through stream 525 or further processed in a wet scrubber (not shown).

The recycle stream 625 can include between about 80% and 99% by volume of sulfur dioxide, between about 1% and 20% by volume of inert gases. Preferably, the recycle stream 625 contains between 90% and 99% by volume of sulfur dioxide, between about 1% and 10% by volume of inert gases. Relative to the incinerator tail gas stream 575, the recycle stream 625 can include between about 95% and 100% by volume of sulfur. Relative to the feed stream 118, the recycle stream 625 can include between about 1% and 40% by volume of the sulfur-containing compounds. Preferably, the recycle stream 625 includes at least 10%, at least 20% or at least 30% by volume of the sulfur-containing compounds of the feed stream 118.

In one embodiment, the recycle stream 625 containing more than 51% by volume of sulfur oxides flows to the first of one or more sequential catalytic reaction zones of a Claus process within the SRU 300. In another embodiment, the recycle stream 625 containing more than 51% by volume of sulfur oxides is split into two or more sequential catalytic reaction zones of a Claus process within the SRU 300. As mentioned above, the Claus process may utilize two or more reaction zones or stages in series. These reaction zones may be two or more distinct zones within a single self-contained unit or these reaction zones may be two or more self-contained reactors arranged in series.

The recycle stream 625 is preferably split to manage or otherwise control the amount of heat liberated during the catalytic conversion of hydrogen sulfide to elemental sulfur. This conversion is equilibrium limited and extremely exothermic leading to high temperature rises. As such, excess sulfur oxides can generate excessive heat without contributing to the conversion of hydrogen sulfide to elemental sulfur. Further, this excessive heat can damage process the equipment, the catalyst, or both. Considerations to accommodate these high temperature rises include more expensive equipment that can withstand higher temperatures, special isothermal reactors with internal heat exchangers, and larger coolers to remove the heat generated between reaction zones. All of which, greatly increase the capital expenditure and operating costs of the SRU 300.

By splitting the recycle stream 625, the sulfur oxides recycled to the Claus process may be dispersed among the various reaction zones to control the amount of heat liberated. As such, less heat is generated within a given reaction zone protecting the equipment and catalyst as well as requiring less heat to be removed. Preferably, the recycle stream 625 is split into multiple feed streams such that a temperature rise within a single reaction zone is limited to 800° F. or less, 600° F. or less, or 500° F. or less, or 100° F. or less, or within a range of from a low of about 100° F., or about 200° F., or about 300° F. to a high of about 300° F., or about 400° F., or about 1000° F. Since the catalytic reaction of hydrogen sulfide and sulfur dioxide to elemental sulfur is equilibrium limited, the conversion rate of hydrogen sulfide to elemental sulfur is unaffected. Further, the throughput rate of the Claus process is not affected. Accordingly, splitting the recycle stream 625 into two or more streams to two or more reaction zones significantly reduces costs while allowing adjustment of the performance or efficiency of each of the Claus reaction zones. Furthermore, space velocities within the Claus reactors of up to 2000 $hr^{-1}$, or up to 3000 $hr^{-1}$, or up to 4000 $hr^{-1}$, or up to 10,000 $hr^{-1}$, can be achieved.

Further regarding FIG. 4, by selectively separating the carbon dioxide into the first stream 145A,B that bypasses the SRU 300, the total volume of carbon dioxide which must be processed by the SRU 300 is significantly reduced. Furthermore, the greater the amount of aromatic hydrocarbons and sulfur containing compounds other than hydrogen sulfide which are directed around the SRU 300 the smaller the SRU 300 equipment can be. These bypass first streams being incinerated and recycled as essentially pure sulfur dioxide, in addition to the increased concentration of hydrogen sulfide created in the second stream, allow a much smaller SRU 300 to efficiently recover basically the same amount of sulfur due to the increase in partial pressures of hydrogen sulfide and sulfur dioxide in the one or more catalytic reaction zones.

What is claimed is:

1. A method for removing sulfur-containing compounds, comprising:
   selectively separating a feed stream comprising carbon dioxide and one or more sulfur-containing compounds, including hydrogen sulfide, at conditions sufficient to produce a first stream comprising carbon dioxide and hydrogen sulfide and a second stream comprising carbon dioxide and hydrogen sulfide, wherein:
   a molar ratio of carbon dioxide to hydrogen sulfide in the first stream is greater than a molar ratio of carbon dioxide to hydrogen sulfide in the second stream;
   a molar ratio of hydrogen sulfide in the first stream to hydrogen sulfide in the second stream is about 0.005 or more; and
   selectively separating the feed stream comprises flashing the feed stream in a single stage.

2. The method of claim 1, wherein the second stream comprises 60 percent by volume or more of the one or more sulfur-containing compounds of the feed.

3. The method of claim 1, wherein the second stream comprises at least 60 percent by volume of the hydrogen sulfide of the feed.

4. The method of claim 1, wherein the first stream comprises a plurality of streams.

5. The method of claim 1, wherein the first stream comprises a plurality of streams and a total of the plurality of streams contains at least 0.5 percent by volume of the one or more sulfur-containing compounds from the feed stream.

6. The method of claim 1, wherein the first stream comprises a plurality of streams and one or more of the plurality of streams comprises at least 51 percent by volume of carbon dioxide.

7. The method of claim 1, wherein the first stream comprises at least 20 percent by volume of the carbon dioxide from the feed stream.

8. The method of claim 1, wherein the one or more sulfur-containing compounds comprises derivatives of hydrogen sulfide.

9. The method of claim 1, wherein the one or more sulfur containing compounds comprises one or more mercaptans or derivatives thereof.

10. The method of claim 1, wherein the one or more sulfur-containing compounds comprises carbonyl sulfide or derivatives thereof.

11. The method of claim 1, wherein the feed stream further comprises one or more aromatic hydrocarbons.

12. The method of claim 1, wherein the feed stream further comprises a solvent.

13. The method of claim 1, wherein the feed stream further comprises one or more amines or derivatives thereof.

14. The method of claim 1, wherein the feed stream comprises a solvent capable of at least partially absorbing the hydrogen sulfide and carbon dioxide of the feed stream.

15. The method of claim 1, wherein both the first stream and the second stream comprise hydrogen sulfide in different concentrations.

16. The method of claim 1, wherein the second stream comprises a greater concentration of hydrogen sulfide than the first stream.

17. The method of claim 1, wherein the second stream comprises about 50 percent by volume to about 99 percent by volume of hydrogen sulfide and the first stream comprises about 0.01 percent by volume to about 50 percent by volume of hydrogen sulfide.

18. The method of claim 1, wherein selectively separating a feed stream comprises flashing the feed stream in a single stage at a pressure less than 70 psig at a temperature of about 100° F. to about 240° F. to produce the first stream and the second stream.

19. The method of claim 1, wherein selectively separating a feed stream comprises flashing the feed stream in a single stage at a pressure between about 20 psig and about 70 psig at a temperature of about 200° F. to about 240° F.

20. The method of claim 1, wherein selectively separating a feed stream comprises heating the feed stream to a temperature of about 100° F. to about 300° F. and then flashing the feed stream in a single stage at a pressure less than 50 psig.

21. A method for removing sulfur-containing compounds, comprising:

selectively separating a feed stream comprising carbon dioxide and one or more sulfur-containing compounds, including hydrogen sulfide, at conditions sufficient to produce a first stream comprising carbon dioxide and hydrogen sulfide and a second stream comprising carbon dioxide and hydrogen sulfide, wherein:
a molar ratio of carbon dioxide to hydrogen sulfide in the first stream is greater than a molar ratio of carbon dioxide to hydrogen sulfide in the second stream;
a molar ratio of hydrogen sulfide in the first stream to hydrogen sulfide in the second stream is about 0.005; and
selectively separating the feed stream comprises flashing the feed stream in a single stage;
passing the second stream to a sulfur recovery process to produce a tail gas stream; and
bypassing the first stream around the sulfur recovery process to produce a bypassed stream.

22. The method of claim 21, wherein the sulfur recovery process is a Claus process.

23. The method of claim 21, wherein the sulfur recovery process is a Claus process comprising a thermal zone and a catalytic reaction zone.

24. The method of claim 21, wherein the sulfur recovery process is a Claus process comprising a thermal zone and multiple catalytic reaction zones.

25. A method for removing sulfur-containing compounds, comprising:

selectively separating a feed stream comprising carbon dioxide and one or more sulfur-containing compounds, including hydrogen sulfide, at conditions sufficient to produce a first stream comprising carbon dioxide and hydrogen sulfide and a second stream comprising carbon dioxide and hydrogen sulfide, wherein:
a molar ratio of carbon dioxide to hydrogen sulfide in the first stream is greater than a molar ratio of carbon dioxide to hydrogen sulfide in the second stream;
a molar ratio of hydrogen sulfide in the first stream to hydrogen sulfide in the second stream is about 0.005; and
selectively separating the feed stream comprises at least partially flashing the feed stream in a single stage;
passing the second stream to a sulfur recovery process to produce a tail gas stream; and
bypassing the first stream around the sulfur recovery process to produce a bypassed stream, wherein the sulfur recovery process includes a catalytic reaction zone and lacks a thermal zone such that the second stream contacts one or more catalysts without an increase in temperature of greater than 600° F.

26. The method of claim 21, wherein the sulfur recovery process is a Claus process comprising only a catalytic reaction section having one or more catalytic reaction zones such that the second stream contacts the one or more catalytic reaction zones without an increase in temperature of greater than 600° F.

27. The method of claim 21, further comprising passing the second stream through an acid gas enrichment process prior to the sulfur recovery process.

28. A method for removing sulfur-containing compounds, comprising:

selectively separating a feed stream comprising carbon dioxide and one or more sulfur-containing compounds, including hydrogen sulfide, at conditions sufficient to produce a first stream comprising carbon dioxide and hydrogen sulfide and a second stream comprising carbon dioxide and hydrogen sulfide, wherein:
a molar ratio of carbon dioxide to hydrogen sulfide in the first stream is greater than a molar ratio of carbon dioxide to hydrogen sulfide in the second stream, and
a molar ratio of hydrogen sulfide in the first stream to hydrogen sulfide in the second stream is about 0.005 or more; and
selectively separating the feed stream comprises at least partially flashing the feed stream in a single stage;
passing the second stream to a sulfur recovery process to produce a tail gas stream;
bypassing the first stream around the sulfur recovery process to produce a bypassed stream; and
capturing remaining sulfur-containing compounds from the tail gas stream and the bypassed stream.

29. The method of claim 28, wherein selectively separating the feed stream comprises at least partially flashing the feed stream in two or more stages.

30. The method of claim 28, wherein capturing remaining sulfur-containing compounds comprises incinerating the tail gas and bypassed streams.

31. The method of claim 28, wherein capturing remaining sulfur-containing compounds comprises incinerating the tail gas and bypassed streams and capturing sulfur dioxide from the incinerated tail gas and bypassed streams to produce a sulfur dioxide rich stream.

32. The method of claim 28, wherein capturing remaining sulfur-containing compounds comprises incinerating the tail gas and bypassed streams; capturing sulfur dioxide from the incinerated tail gas and bypassed streams to produce a sulfur dioxide rich stream; and passing at least a portion of the sulfur dioxide rich stream to the sulfur recovery process.

33. The method of claim 28, wherein capturing remaining sulfur-containing compounds comprises incinerating the tail gas and bypassed streams, scrubbing the incinerated streams, and passing a recycle gas stream consisting essentially of sulfur dioxide to the sulfur recovery process.

34. The method of claim 28, wherein capturing remaining sulfur-containing compounds comprises incinerating the tail gas and bypassed stream; contacting the incinerated streams with one or more solvents selected from the group consisting of sulfites, caustic soda, alkanolamines, aromatic amines, diamines, sterically hindered amines, derivatives thereof, and combination or mixtures thereof; and passing a recycle gas stream consisting essentially of sulfur dioxide to the sulfur recovery process.

35. The method of claim 28, further comprising passing the second stream through an acid gas enrichment process prior to the sulfur recovery process.

36. The method of claim 35, wherein the acid gas enrichment process utilizes amine absorption techniques to selectively capture hydrogen sulfide.

37. The method of claim 35, wherein the acid gas enrichment process utilizes MDEA or sterically hindered amine to selectively capture hydrogen sulfide.

38. A method for removing sulfur-containing compounds comprising:

selectively separating a feed stream comprising carbon dioxide and one or more sulfur-containing compounds, including hydrogen sulfide, at conditions sufficient to produce a first stream comprising carbon dioxide and hydrogen sulfide and a second stream comprising carbon dioxide and hydrogen sulfide, wherein:

a molar ratio of carbon dioxide to hydrogen sulfide in the first stream is greater than a molar ratio of carbon dioxide to hydrogen sulfide in the second stream, and a molar ratio of hydrogen sulfide in the first stream to hydrogen sulfide in the second stream is about 0.005 or more;

capturing sulfur dioxide from the first stream, the second stream or both to produce a sulfur dioxide recycle stream; and splitting the sulfur dioxide recycle stream into two or more sequential catalytic reaction zones of a Claus process.

39. The method of claim 38, wherein the second stream or the sulfur dioxide recycle stream or both comprise at least 10 percent by volume of the one or more sulfur-containing compounds of the feed.

40. A method for removing sulfur-containing compounds, comprising:

flashing in a single stage at a pressure of less than 70 psig a feed stream comprising carbon dioxide and one or more sulfur-containing compounds, including hydrogen sulfide, to produce a first stream comprising carbon dioxide and hydrogen sulfide and a second stream comprising carbon dioxide and hydrogen sulfide, wherein:

a molar ratio of carbon dioxide to hydrogen sulfide in the first stream is greater than a molar ratio of carbon dioxide to hydrogen sulfide in the second stream, and a molar ratio of hydrogen sulfide in the first stream to hydrogen sulfide in the second stream is about 0.005 or more; and passing the second stream to a sulfur recovery process to remove at least a portion of the one or more sulfur-containing compounds.

41. The method of claim 40, wherein the feed stream comprises a rich solvent stream.

42. The method of claim 40, wherein the pressure is less than 70 psig at a temperature of about 200° F. to about 240° F.

43. The method of claim 40, wherein the pressure is between about 20 psig and about 50 psig at a temperature of about 200° F. to about 240° F.

44. The method of claim 40, further comprising heating the feed stream to a temperature of about 100° F. to about 300° F. and then flashing the feed stream at a pressure less than 50 psig.

45. The method of claim 40, wherein the one or more sulfur-containing compounds comprises derivatives of hydrogen sulfide.

46. The method of claim 40, wherein the one or more sulfur-containing compounds comprises one or more mercaptans or derivatives thereof.

47. The method of claim 40, wherein the one or more sulfur-containing compounds comprises carbonyl sulfide or derivatives thereof.

48. The method of claim 40, wherein the feed stream further comprises one or more aromatic hydrocarbons.

49. The method of claim 40, wherein the feed stream further comprises a solvent.

50. The method of claim 40, wherein the feed stream further comprises one or more amines or derivatives thereof.

51. The method of claim 40, wherein the feed stream comprises a solvent capable of at least partially absorbing the hydrogen sulfide and carbon dioxide of the feed stream.

52. The method of claim 40, wherein both the first stream and the second stream comprise hydrogen sulfide in different concentrations.

53. The method of claim 40, wherein the second stream comprises a greater concentration of hydrogen sulfide than the first stream.

54. The method of claim 40, wherein the second stream comprises about 60 percent to 99 percent by volume of hydrogen sulfide and the first stream comprises about 0.01 percent to about 50 percent by volume of hydrogen sulfide.

55. A method for removing sulfur-containing compounds, comprising:

selectively separating a rich solvent stream comprising carbon dioxide and one or more sulfur-containing compounds, including hydrogen sulfide, at conditions sufficient to produce a first stream comprising carbon dioxide and hydrogen sulfide and a second stream comprising carbon dioxide and hydrogen sulfide, wherein:

a molar ratio of carbon dioxide to hydrogen sulfide in the first stream is greater than a molar ratio of carbon dioxide to hydrogen sulfide in the second stream, and a molar ratio of hydrogen sulfide in the first stream to hydrogen sulfide in the second stream is about 0.25 or more; and wherein further selectively separating the rich solvent stream comprises flashing the rich solvent stream in a single stage.

56. A method for removing sulfur-containing compounds, comprising:

selectively separating a rich solvent stream comprising carbon dioxide and one or more sulfur-containing compounds, including hydrogen sulfide, at conditions sufficient to produce a first stream comprising carbon dioxide and hydrogen sulfide and a second stream comprising carbon dioxide and hydrogen sulfide, wherein:

a molar ratio of carbon dioxide to hydrogen sulfide in the first stream is greater than a molar ratio of carbon dioxide to hydrogen sulfide in the second stream, and a molar ratio of hydrogen sulfide in the first stream to hydrogen sulfide in the second stream is about 0.25 or more;

passing the second stream to a sulfur recovery process to produce a tail gas stream;

bypassing the first stream around the sulfur recovery process to produce a bypassed stream; and capturing remaining sulfur-containing compounds from the tail gas stream and the bypassed stream.

57. The method of claim 56, wherein selectively separating the rich solvent stream comprises at least partially flashing the feed stream in two or more stages.

58. The method of claim 38, wherein selectively separating the feed stream comprises at least partially flashing the feed stream in two or more stages.

* * * * *